United States Patent
Carlsson et al.

(10) Patent No.: US 8,241,507 B2
(45) Date of Patent: Aug. 14, 2012

(54) METHOD AND DEVICE FOR SEPARATION OF A LIQUID FLUID BY CENTRIFUGAL SEPARATION AND EVAPORATION

(75) Inventors: Claes-Göran Carlsson, Tullinge (SE); Leonard Borgström, Tyresö (SE); Carl Häggmark, Täby (SE); Hans Moberg, Stockholm (SE); Jan Skoog, Skogas (SE)

(73) Assignee: Alfa-Laval Corporate AB, Lund (SE)

( * ) Notice: Subject to any disclaimer, the term of this patent is extended or adjusted under 35 U.S.C. 154(b) by 468 days.

(21) Appl. No.: 12/445,520

(22) PCT Filed: Nov. 1, 2007

(86) PCT No.: PCT/SE2007/000963
§ 371 (c)(1),
(2), (4) Date: Jun. 11, 2009

(87) PCT Pub. No.: WO2008/054289
PCT Pub. Date: May 8, 2008

(65) Prior Publication Data
US 2010/0084314 A1    Apr. 8, 2010

(30) Foreign Application Priority Data
Nov. 2, 2006 (SE) ........................... 0602343

(51) Int. Cl.
*C10G 33/00* (2006.01)
(52) U.S. Cl. .................. 210/787; 210/304; 210/512.3; 208/187; 196/46
(58) Field of Classification Search .......... 210/304, 210/512.3, 787; 208/187; 196/46
See application file for complete search history.

(56) References Cited

U.S. PATENT DOCUMENTS

| | | | |
|---|---|---|---|
| 3,951,771 A | * | 4/1976 | Burger ..................... 204/561 |
| 5,093,006 A | * | 3/1992 | Kalnins ..................... 210/704 |
| 5,980,694 A | * | 11/1999 | Apeldoorn et al. ......... 202/152 |

FOREIGN PATENT DOCUMENTS

| | | |
|---|---|---|
| RU | 2236377 C2 | 9/2004 |
| WO | 2004039922 A1 | 5/2004 |

OTHER PUBLICATIONS

PCT International Search Report; International Application No. PCT/SE2007/000963; Filed January 1, 2007.

* cited by examiner

*Primary Examiner* — Walter D Griffin
*Assistant Examiner* — Brian McCaig
(74) *Attorney, Agent, or Firm* — Michaud-Kinney Group LLP

(57) ABSTRACT

A method and a device for separation of a fluid in the liquid state comprising two liquids that are not mutually miscible, with different densities, wherein a first liquid is to be cleansed from a second liquid, whereby the fluid in the liquid state is conducted through a rotor where centrifugal separation of the second liquid from the first liquid takes place, and is then conducted into a tank, with the proportion of the second liquid being reduced to less than 5%, and by conducting the fluid, after centrifugal separation, through a restriction, whereby the pressure of the fluid in the liquid state is reduced, which causes portions of the fluid in the liquid state to evaporate so that further portions of the second liquid escape in the form of a gas which is conducted away, thereby further reducing the proportion of the second liquid in the outgoing fluid in the liquid state.

16 Claims, 1 Drawing Sheet

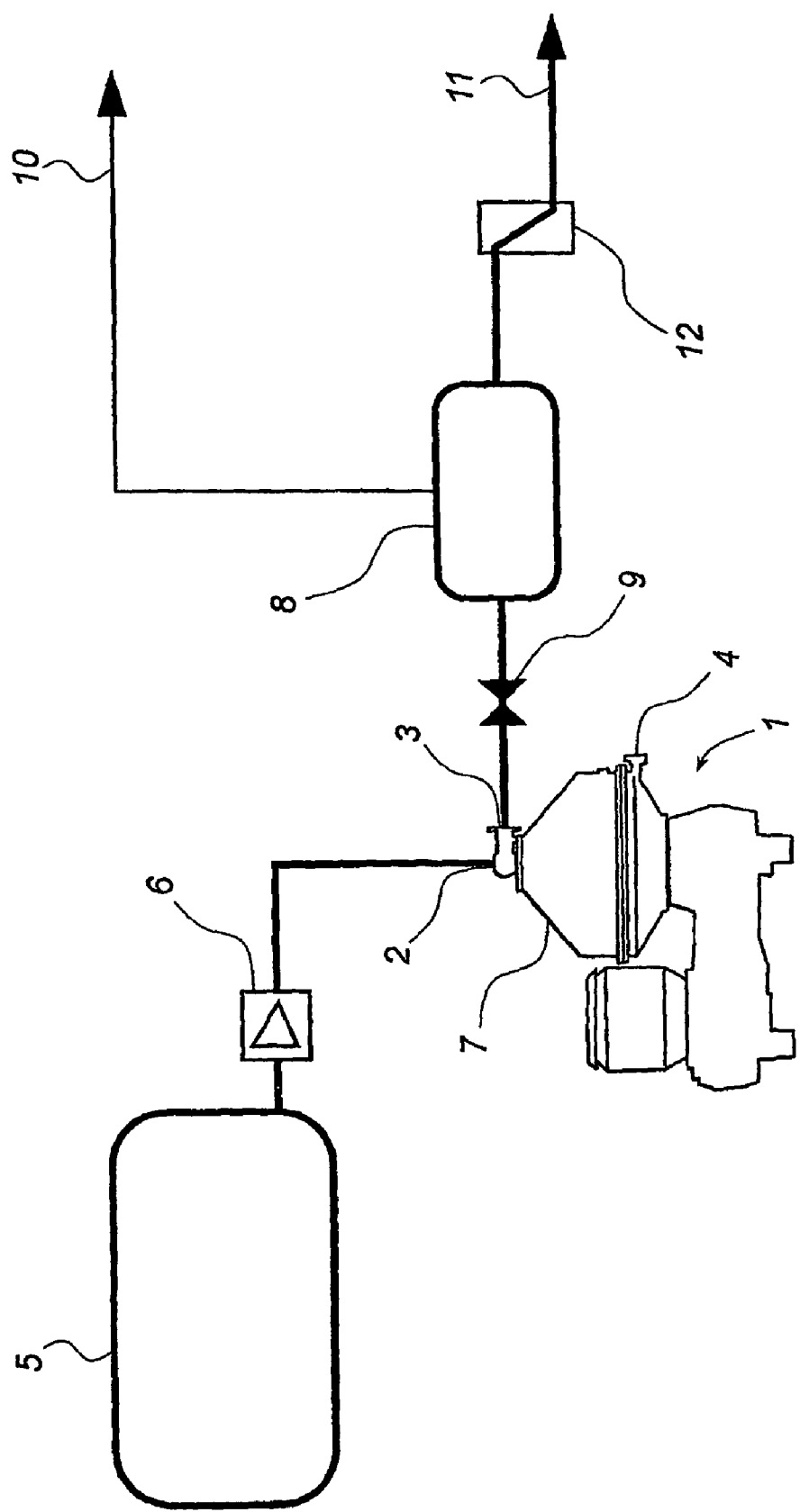

METHOD AND DEVICE FOR SEPARATION OF A LIQUID FLUID BY CENTRIFUGAL SEPARATION AND EVAPORATION

FIELD OF THE INVENTION

The present invention relates generally to a method and a device for cleaning of a fluid. More specifically the present invention relates to a method for separation of a fluid in the liquid state according to the preamble of claim 1 comprising two liquids that are not mutually miscible, with different densities, wherein a first liquid is to be cleansed from a second liquid, said method comprising conducting the fluid in the liquid state through a rotor, where centrifugal separation of the second liquid from the first liquid takes place, and then conducted into a tank, in which the proportion of the second liquid is reduced to less than 5%.

The invention also relates more specifically to a device for separation of a fluid in the liquid state comprising two liquids with different densities, in which a first liquid is to be cleansed from a second liquid, which comprises a centrifugal separator comprising an inlet for the fluid in the liquid state, a rotor for separation of the second liquid from the first liquid, a first outlet for discharge of the first liquid and a second outlet for discharge of the second liquid, and a tank, which communicates with the centrifugal separator for receiving separated fluid in the liquid state from the centrifugal separator.

BACKGROUND OF THE INVENTION

A problem in the separation of the fluid in the liquid state is that the proportion of the second liquid in the first liquid after separation in the centrifugal separator can be too large. As a result the product after separation is not sufficiently pure.

WO 2004/039922 discloses to a device for cleaning of lubricating oils. The lubricating oil is separated in two stages, in which it first passes through a centrifugal separator and then passes further downwards through an outlet directly into a vacuum-chamber. The second separation stage takes place in the vacuum chamber. A vacuum pump is arranged in the connection to the vacuum chamber and functions in a way such that it lowers the pressure and takes away water which usually condenses from steam from the vacuum chamber, which makes the device complicated and expensive.

The fluid that is to be cleaned can, as shown in WO 2004/039922, consist of a lubricating oil that contains mostly water as contaminant and does not contain volatile components. Use of a vacuum chamber after the centrifugal separator for taking away the water can function satisfactorily in this case. If, however, a fluid is to be cleansed from, among other things, water that additionally contains a proportion of volatile components, separation in the vacuum chamber does not work. This is because evaporation is excessive, since the volatile components evaporate more easily than the water, i.e. at lower temperature and/or higher pressure, with the result that an unnecessarily large proportion of volatile hydrocarbons escapes.

SUMMARY OF THE INVENTION

One object of the present invention is to provide a method of the aforementioned type with an improved degree of cleaning of the fluid without the need for vacuum pumping.

This object is achieved with the method stated in the introduction, which is characterised in that the fluid, after centrifugal separation, is conducted through a restriction, so that the pressure of the fluid in the liquid state decreases, which allows portions of the fluid in the liquid state to evaporate so that further portions of the second liquid escape in the form of a gas which is conducted away, thereby further reducing the proportion of the second liquid in the outgoing fluid in the liquid state.

A second object is to provide a simple device for improving the degree of separation.

The above-desired object is also achieved with the device stated in the introduction, which is characterised in that the device also includes a restriction arranged between the centrifugal separator and the first tank, with which the pressure on the fluid in the liquid state is reduced, so that portions of the fluid in the liquid state including portions of remaining second liquid evaporate and escape from the separated fluid in the liquid state in connection with its entering the first tank.

According to one embodiment of the present invention, the fluid in the liquid state contains at least one volatile component dissolved in the first liquid, which is caused to escape as gas when the pressure is lowered, and entrains vapours of the second liquid and thus further reduces the proportion of the second liquid in the outgoing fluid in the liquid state. The fluid in the liquid state can contain hydrocarbons, for example methane, and the second liquid can have a higher density than the first liquid. Alternatively the second liquid can have a lower density than the first liquid.

According to a further embodiment of the invention, the method includes the possibility of reducing the proportion of the second liquid in the outgoing fluid in the liquid state to less than 1% by means of the restriction arranged after the centrifugal separator. With an effective restriction, the outgoing fluid in the liquid state can be reduced so as to contain at most 0.5% of the second liquid.

The fluid in the liquid state that is to be separated can be composed, for example, of a mineral oil and more specifically crude oil obtained in oil extraction. The second liquid that evaporates is in this case water. The water content in the crude oil before separation can be approx. 20%. After separation in the centrifugal separator the water content is approx. 1%. To lower the water content even further, the crude oil is passed through the restriction in the form of e.g. a valve and then into a tank, where the volatile components escape as gas. The fluid in the liquid state can alternatively be solvent-diluted bitumen or any other suitable oil-containing raw material whatever. Moreover, the restriction can alternatively be a so-called CPM-valve, where the abbreviation CPM denotes Constant-Pressure-Modulating, a throttle plate, a ball valve, a butterfly valve, a manual opening/closing valve or any other suitable valve whatever.

BRIEF DESCRIPTION OF THE DRAWINGS

The invention will now be explained in more detail with a description of various embodiments and with reference to the appended drawings.

FIG. 1 shows schematically a device according to the invention.

DETAILED DESCRIPTION OF VARIOUS EMBODIMENTS OF THE INVENTION

FIG. 1 shows a device for separation of a fluid in the liquid state comprising two liquids with different densities. The device comprises a centrifugal separator 1 for separation of fluid in the liquid state. The centrifugal separator comprises an inlet 2 for receiving the fluid in the liquid state, a rotor (not shown) for separation of the liquids, a first outlet 3 for discharge of a first liquid, and a second outlet 4 for discharge of a second liquid. The fluid in the liquid state is fed from a tank 5 for storage of the fluid before separation thereof, via a pump 6 to the centrifugal separator 1.

To make the fluid manageable with regard to its viscosity, it is preheated to approx. 110° C. and pressurised to approx. 3 bar relative to atmospheric pressure in tank 5. To provide the pressure and temperature levels that are required, the rotor is surrounded by a pressure vessel 7.

After the fluid in the liquid state has been separated in the centrifugal separator 1 it is conveyed to a tank 8 for receiving separated fluid in the liquid state from the centrifugal separator 1. Between the tank 8 and the centrifugal separator 1, a valve 9 is provided, by means of which the pressure can be lowered from approx. 3 bar relative to the atmospheric pressure to approx. 0.5 bar relative to the atmospheric pressure. The fluid in the liquid state contains volatile hydrocarbons, mostly methane. Said hydrocarbons occur in the form of gas, which is also saturated with water vapour formed from the water remaining after separation. When the pressure is lowered by valve 9, the gas saturated with water vapour in tank 8 is discharged (shown by arrow 10 in FIG. 1). On discharge, the gas entrains a certain amount of water vapour, thus further reducing the proportion of water in the fluid in the liquid state that is to be conveyed further (shown by arrow 11 in FIG. 1). Before the fluid in the liquid state is conveyed further, it can be cooled by means of a cooler 12. Said cooler can be of any suitable type whatever.

The invention is not limited to the embodiments shown, but can be varied and modified within the scope of the following patent claims.

The invention claimed is:

1. A method for the separation of a fluid in the liquid state comprising two liquids that are not mutually miscible, with different densities, wherein a first liquid is to be cleansed from a second liquid, said method comprising:
   conducting the fluid in the liquid state through a rotor where centrifugal separation of the second liquid from the first liquid takes place, and an outgoing fluid comprising the first liquid and a portion of the second liquid is then conducted into a tank, whereby the proportion of the second liquid in the outgoing fluid is reduced to less than 5%, and
   after centrifugal separation, the outgoing fluid is conducted through a restriction, whereby the pressure of the outgoing fluid in the liquid state is reduced, which causes portions of the second liquid in the liquid state to evaporate so that further portions of the second liquid escape in the form of a gas which is conducted away, thereby further reducing the proportion of the second liquid in the outgoing fluid in the liquid state.

2. A method according to claim 1, wherein the fluid in the liquid state contains at least one volatile component dissolved in the first liquid, which is caused to escape as gas on lowering of the pressure, and entrains vapours of the second liquid and in this way further reduces the proportion of the second liquid in the outgoing fluid in the liquid state.

3. A method according to claim 2, wherein the volatile component, which is caused to escape as gas on lowering of the pressure, is composed of a hydrocarbon.

4. A method according to claim 1, wherein the proportion of the second liquid in the outgoing fluid in the liquid state is reduced to less than about 1%.

5. A method according to claim 1, wherein the proportion of the second liquid in the outgoing fluid in the liquid state is reduced to at most 0.5%.

6. A method according to claim 1, characterised in that the second liquid, which is caused to escape as gas on lowering of the pressure, has a higher density than the first liquid.

7. A method according to claim 1, wherein the first liquid is composed of mineral oil and the second liquid, which is caused to escape as gas on lowering of the pressure, is composed of water.

8. A method according to claim 1, wherein the centrifugal separation is brought about by means of a pressure vessel enclosing the rotor.

9. A device for separation of a fluid in the liquid state comprising two liquids that are not mutually miscible, with different densities, wherein a first liquid is to be cleansed from a second liquid, which comprises:
   a centrifugal separator comprising an inlet for the fluid in the liquid state, a rotor for separation of the second liquid from the first liquid, a first outlet for discharge of the first liquid and a second outlet for discharge of the second liquid, and
   a tank, which communicates with the centrifugal separator for receiving separated fluid in the liquid state from the centrifugal separator, and
   the device also comprises a restriction arranged between the centrifugal separator and the tank, the restriction being configured to evaporate portions of the second liquid by which the pressure on the fluid in the liquid state is reduced, so that portions of the fluid in the liquid state including portions of remaining second liquid are evaporated and escape from the separated fluid in the liquid state in connection with entry thereof in the tank.

10. A device according to claim 9, wherein the proportion of the second liquid in the outgoing fluid is from the first outlet of the centrifugal separator and is reduced to less than about 1%.

11. A device according to any one of claims 9-10, characterised in that the amount of the second liquid in the outgoing fluid is from the first outlet of the centrifugal separator and is reduced to a maximum of about 0.5%.

12. A device according to claim 9, wherein the first liquid is composed of mineral oil and the second liquid is composed of water.

13. A device according to claim 9, wherein the restriction comprises a valve.

14. A device according to claim 9, wherein the centrifugal separator comprises a pressure vessel enclosing the rotor.

15. A device according to claim 9, wherein the device comprises another tank for storage of the fluid in the liquid state before separation thereof, which is designed to maintain a specific pressure and a specific temperature of the fluid in the liquid state.

16. A device according to claim 15, wherein the device comprises a pump between the tank for storage of the fluid in the liquid state before separation thereof and the centrifugal separator, which is designed to convey the fluid in the liquid state under pressure from tank for storage of the fluid in the liquid state prior to separation, to the centrifugal separator.

* * * * *